(12) United States Patent
Suzuki et al.

(10) Patent No.: US 11,947,520 B2
(45) Date of Patent: Apr. 2, 2024

(54) STORAGE MEDIUM, TRANSMISSION SUPPORT DEVICE, AND TRANSMISSION SUPPORT METHOD

(71) Applicant: FUJITSU LIMITED, Kawasaki (JP)

(72) Inventors: Dai Suzuki, Kawasaki (JP); Koki Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 17/590,841

(22) Filed: Feb. 2, 2022

(65) Prior Publication Data

US 2022/0360681 A1  Nov. 10, 2022

(30) Foreign Application Priority Data

May 10, 2021 (JP) ................. 2021-079437

(51) Int. Cl.
*G06F 7/00* (2006.01)
*G06F 16/23* (2019.01)

(52) U.S. Cl.
CPC ................ *G06F 16/2365* (2019.01)

(58) Field of Classification Search
CPC ............ G06F 16/2365; G06F 16/2457; G06Q 30/0251; G06Q 30/0256
USPC ................................. 707/600–899
See application file for complete search history.

(56) References Cited

U.S. PATENT DOCUMENTS

2008/0109462 A1 * 5/2008 Adams ................. G06Q 10/107
2013/0018886 A1    1/2013 Minamizawa

FOREIGN PATENT DOCUMENTS

JP    2003-115011 A    4/2003
WO    2011/105008 A1    9/2011

OTHER PUBLICATIONS

Anonymous, "Using the Intersect keyword", IBM Documentation, Mar. 8, 2021, XP055942441 Retrieved from the Internet: URL: https://www.ibm.com/docs/en/i/7.1?topic=statement-using-intersect-keyword [retrieved on Jul. 14, 2022], 4 pages.
Extended European Search Report dated Jul. 25, 2022 for corresponding to European Patent Application No. 22155844.8, 10 pages. *Please note US-2013/0018886-A1 cited herewith, was previously cited in an IDS filed on Feb. 2, 2022.*

\* cited by examiner

*Primary Examiner* — Isaac M Woo
(74) *Attorney, Agent, or Firm* — Fujitsu Intellectual Property Center

(57) ABSTRACT

A non-transitory computer-readable storage medium storing a transmission support program that causes at least one computer to execute a process, the process includes generating a management identifier of a message in response to reception of the message; returning the management identifier to a transmitter of the message; when receiving the management identifier and lists of personal identifiers of individuals who have attributes according to conditions regarding the attributes, from each of a plurality of companies that holds information on the attributes of the individuals, based on reception of the conditions and the management identifier from the transmitter, specifying the personal identifiers that are duplicate between the lists that have the management identifier that is common; and transmitting the specified personal identifiers and the received message.

18 Claims, 15 Drawing Sheets

FIG. 5

| MANAGEMENT ID | FIRST TRANSMISSION SUPPORT PROGRAM ID | MESSAGE | DESTINATION DETERMINATION PROGRAM ID | RECEIVED ID | USER LIST |
|---|---|---|---|---|---|
| 1 | β | "MESSAGE 2" | C,E,F | C,E,F | "USER LIST C" "USER LIST E" "USER LIST F" |
| 2 | α | "MESSAGE 1" | A,B | | |

TBL
211

| USER ID | GENDER | EDUCATIONAL BACKGROUND | HOBBIES/PREFERENCES |
|---|---|---|---|
| a | FEMALE | GRADUATE OF ×× DEPARTMENT OF ○○ UNIVERSITY | TENNIS |
| b | MALE | GRADUATE OF ◇◇ DEPARTMENT OF △△ UNIVERSITY | READING |
| : | : | : | : |
| f | MALE | GRADUATE OF ** HIGH SCHOOL | SOCCER |
| : | : | : | : |
| h | MALE | GRADUATE OF ○○ HIGH SCHOOL | TRIP |

411

STORAGE MEDIUM, TRANSMISSION SUPPORT DEVICE, AND TRANSMISSION SUPPORT METHOD

CROSS-REFERENCE TO RELATED APPLICATION

This application is based upon and claims the benefit of priority of the prior Japanese Patent Application No. 2021-79437, filed on May 10, 2021, the entire contents of which are incorporated herein by reference.

FIELD

The embodiments discussed herein are related to a storage medium, a transmission support device, and a transmission support method.

BACKGROUND

A technique of extracting users who meet the condition "(age=30s) AND (gender=male) AND (current position=Akihabara)" made up of a plurality of user attributes is known. In addition, a technique of distributing an advertisement according to a user attribute or the like while protecting personal information is also known.

International Publication Pamphlet No. WO 2011/105008 and Japanese Laid-open Patent Publication No. 2003-115011 are disclosed as related art.

SUMMARY

According to an aspect of the embodiments, a non-transitory computer-readable storage medium storing a transmission support program that causes at least one computer to execute a process, the process includes generating a management identifier of a message in response to reception of the message; returning the management identifier to a transmitter of the message; when receiving the management identifier and lists of personal identifiers of individuals who have attributes according to conditions regarding the attributes, from each of a plurality of companies that holds information on the attributes of the individuals, based on reception of the conditions and the management identifier from the transmitter, specifying the personal identifiers that are duplicate between the lists that have the management identifier that is common; and transmitting the specified personal identifiers and the received message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an example of a table storage unit.

DESCRIPTION OF EMBODIMENTS

A case where one company holds all the user attributes involved to distribute a message containing an advertisement is rare. For example, some companies hold the date of birth and the place of residence as user attributes but do not hold the gender, while other companies hold the gender but do not hold the date of birth and the place of residence. In this case, it is difficult to distribute a message according to user attributes that meet the three designated conditions of date of birth, place of residence, and gender, according to the user attributes held by one company.

For example, it is conceivable that user attributes held by different companies are provided to another company, and a message is distributed according to the user attributes provided to this another company. However, in this case, this another company will hold a large amount of user attributes, which is not desirable from the viewpoint of protecting personal information.

Thus, in one aspect, it is an object to provide a transmission support program and a transmission support device that support the transmission of a message to an individual who has attributes according to designated conditions, without providing information on the attributes of the individual held by different companies to another company.

The transmission of a message to an individual who has attributes according to designated conditions may be supported without providing information on the attributes of the individual held by different companies to another company.

Hereinafter, modes for carrying out the present embodiments will be described with reference to the drawings.

First Embodiment

Figure 1:
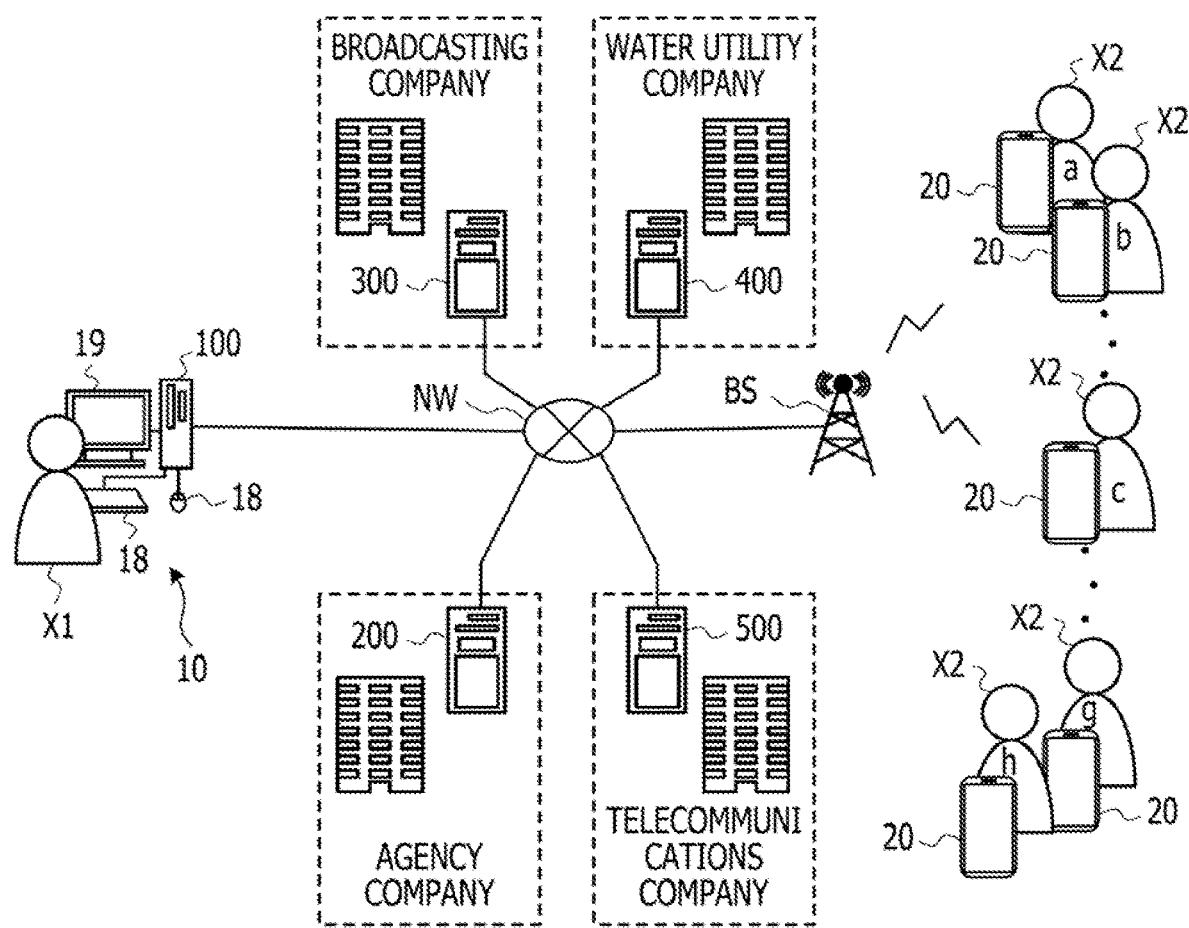
FIG. 1 is an example of a transmission support system.

First, a transmission support system ST will be described with reference to FIG. 1. The transmission support system ST includes a message transmission terminal 10, and a transmission agency server 200, a first database (DB) server 300, a second DB server 400, and a destination resolution server 500 as server devices. A mobile information terminal 20 may also or may not also be included in the transmission support system ST. Although a smartphone is illustrated in FIG. 1 as an example of the mobile information terminal 20, the mobile information terminal 20 is not limited to a smartphone and may also be a mobile phone, a tablet terminal, a notebook personal computer (PC), or the like.

The message transmission terminal 10 includes input devices 18, a display device 19, and a control device 100. The input devices 18 and the display device 19 are connected to the control device 100. In addition, the transmission agency server 200, the first DB server 300, the second DB server 400, the destination resolution server 500, and a mobile base station BS are connected to the control device 100 via a communication network NW. The communication network NW includes at least one of a local area network (LAN) and the Internet. Note that the LAN and the Internet need only include at least one of wired communication and wireless communication.

When an operation is made by a message transmission requester X1 on the input devices 18 to input a message and designated conditions regarding attributes of individuals (hereinafter referred to as users) X2 to whom the message is to be transmitted, the control device 100 receives the message and the designated conditions. When receiving the message and the designated conditions, the control device 100 transmits the message to the transmission agency server 200 or stops the transmission of the message, depending on the results of executing a variety of processes described later. When the transmission of the message is stopped, the control device 100 makes a notification of the transmission error on the display device 19. In this manner, the control device 100 is relevant to a transmission support device that supports the transmission of a message.

The transmission agency server 200 is managed by an agency company that transmits messages as an agency. The agency company is an example of a first company. When receiving the message, the transmission agency server 200 generates a management identifier (ID) of the message and returns the generated management ID to the control device 100. The management ID is an identifier used to manage messages. The transmission agency server 200 manages the management ID, the message, information regarding the transmitter of the message, and the like in association with each other.

Although the details will be described later, the transmission agency server 200 receives a list (hereinafter referred to as a user list) of user IDs of the users X2 having attributes according to the designated conditions, from the first DB server 300 together with the management ID. Similarly, the transmission agency server 200 receives the user list also from the second DB server 400 together with the management ID. When receiving the user lists and the management ID, the transmission agency server 200 specifies user IDs that are duplicate between the user lists having a common management ID. When the user IDs have been specified, the transmission agency server 200 transmits the specified user IDs and the received message to the telecommunications company. In more detail, the transmission agency server 200 transmits a destination list including the specified user IDs and the received message to the destination resolution server 500. In this manner, the transmission agency server 200 is also relevant to the transmission support device that supports the transmission of messages.

The first DB server 300 is managed by, for example, a broadcasting company that provides a broadcasting service to the users X2. The broadcasting company is an example of a second company. Note that the first DB server 300 is not limited to the broadcasting company and, for example, may also be an electric company or the like. The first DB server 300 holds information on attributes of users. For example, the first DB server 300 holds information on the user's residence address and date of birth as the attributes of the user X2. Since the first DB server 300 holds these pieces of information, the first DB server 300 may determine the place of residence and age of the user X2.

When receiving the designated conditions and the management ID from the control device 100, the first DB server 300 transmits the user list of the user IDs of the users X2 having the attributes according to the designated conditions and the management ID to the agency company. In more detail, the first DB server 300 transmits the user list and the management ID to the transmission agency server 200. This causes the transmission agency server 200 to receive the user list and the management ID from the first DB server 300.

The second DB server 400 is managed by, for example, a water utility company that provides a water utility service to the users X2. The water utility company is also an example of the second company. Note that the second DB server 400 is not limited to the water utility company and may also be an electric company or the like as long as the second DB server 400 is different from the broadcasting company. That is, the first DB server 300 and the second DB server 400 need only be managed by different companies. The second DB server 400 also holds information on attributes of users. For example, the second DB server 400 holds information on the user's gender and hobbies/preferences as the attributes of the user X2. Since the second DB server 400 holds these pieces of information, the second DB server 400 may determine the gender and hobbies/preferences of the user X2.

When receiving the designated conditions and the management ID from the control device 100, the second DB server 400 transmits the user list of the user IDs of the users X2 having the attributes according to the designated conditions and the management ID to the agency company. In more detail, the second DB server 400 transmits the user list and the management ID to the transmission agency server 200. This causes the transmission agency server 200 to receive the user list and the management ID from the second DB server 400. That is, the transmission agency server 200 receives the user list and the management ID from each of the first DB server 300 and the second DB server 400.

The destination resolution server 500 is managed by the telecommunications company. The destination resolution server 500 holds destination information corresponding to the user ID. The destination information may also be an Internet protocol (IP) address, a mail address of an electronic mail, a residence address, or the like. When receiving a destination list and the message from the transmission agency server 200, the destination resolution server 500 specifies the destination information corresponding to the user ID included in the destination list. When the destination information has been specified, the destination resolution server 500 transmits the message to the specified destination information.

The message transmitted from the destination resolution server 500 wirelessly reaches the mobile information terminal 20 possessed by the user X2 by way of the communication network NW and the mobile base station BS. Since the user IDs included in the destination list are limited to the user IDs of the users X2 having the attributes according to the designated conditions, the mobile information terminals 20 possessed by the users X2 having the attributes according to the designated conditions are reached. Therefore, when costs such as advertising fees are incurred in proportion to the number of destinations to which the message is transmitted, the costs may be reduced as compared with a case where the message is transmitted by including even an attribute that is not according to the designated conditions.

Next, a hardware configuration of the control device 100 will be described with reference to FIG. 2. Note that, since the hardware configurations of the transmission agency server 200, the first DB server 300, the second DB server 400, and the destination resolution server 500 are basically similar to the hardware configuration of the control device 100, detailed description thereof will be omitted.

Figure 2:
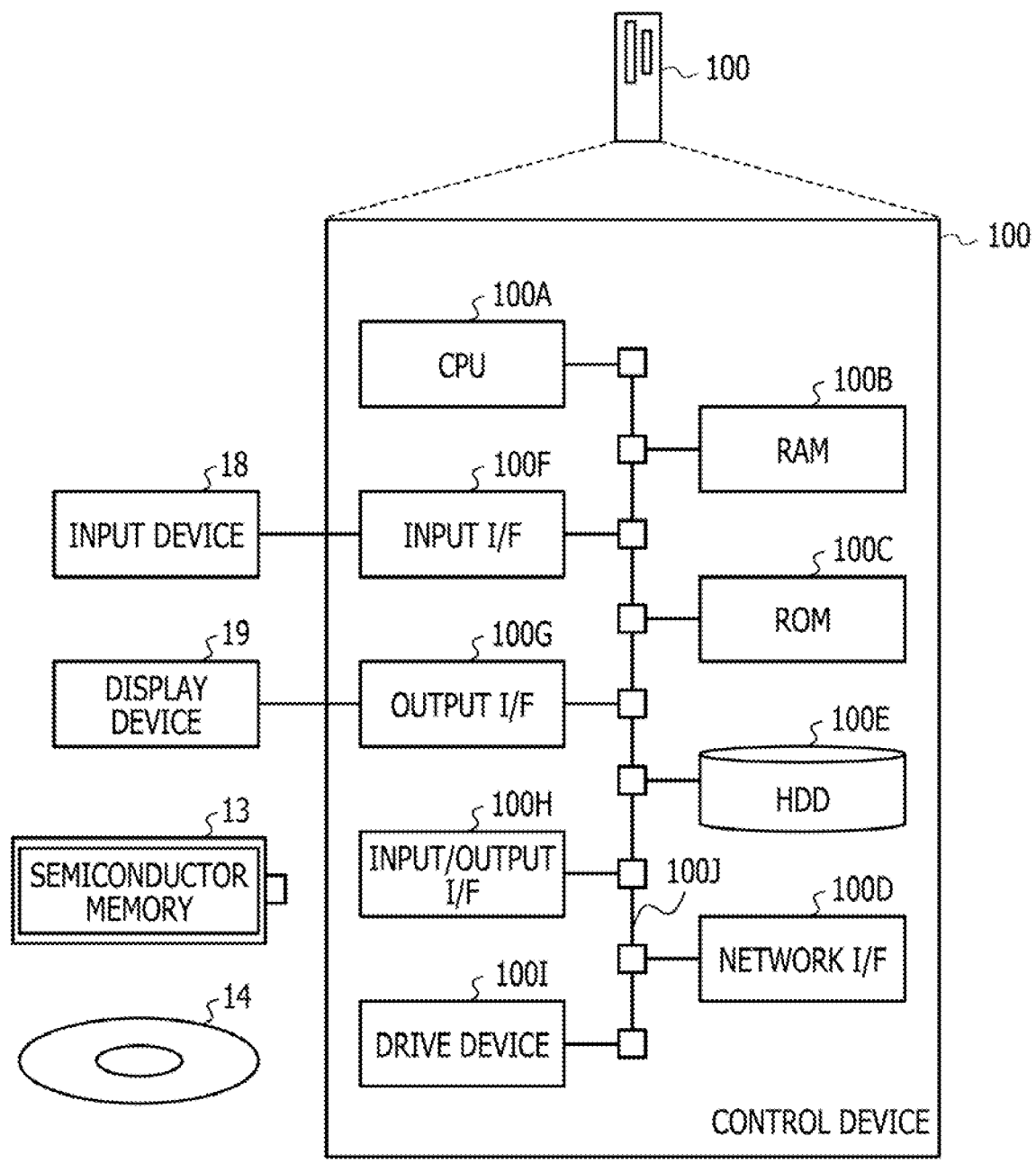
FIG. 2 is an example of the hardware configuration of a control device.

As illustrated in FIG. 2, the control device 100 includes a central processing unit (CPU) 100A as a processor, and a random access memory (RAM) 100B and a read only memory (ROM) 100C as memories. The control device 100 includes a network interface (I/F) 100D and a hard disk drive (HDD) 100E. A solid state drive (SSD) may also be adopted instead of the hard disk drive (HDD) 100E.

The control device 100 may also include at least one of an input I/F 100F, an output I/F 100G, an input/output I/F 100H, and a drive device 100I, if desired. The CPU 100A to the drive device 100I are connected to each other by an internal bus 100J. For example, the control device 100 may be implemented by a computer.

The input device 18 is connected to the input I/F 100F. Examples of the input device 18 include a keyboard, a mouse, a touch panel, and the like. The display device 19 is connected to the output I/F 100G. Examples of the display device 19 include a liquid crystal display and the like. A semiconductor memory 13 is connected to the input/output I/F 100H. Examples of the semiconductor memory 13 include a universal serial bus (USB) memory, a flash memory, and the like. The input/output I/F 100H reads the transmission support program stored in the semiconductor memory 13. The input I/F 100F and the input/output I/F 100H include, for example, USB ports. The output I/F 100G includes, for example, a display port.

A portable recording medium 14 is inserted into the drive device 100I. Examples of the portable recording medium 14 include a removable disk such as a compact disc (CD)-ROM and a digital versatile disc (DVD). The drive device 100I reads the transmission support program recorded in the portable recording medium 14. For example, the network I/F 100D includes a local area network (LAN) port, a communication circuit, and the like.

A first transmission support program stored in at least one of the ROM 100C, the HDD 100E, and the semiconductor memory 13 is temporarily retained in the RAM 100B by the CPU 100A. The first transmission support program recorded on the portable recording medium 14 is temporarily retained in the RAM 100B by the CPU 100A. When the CPU 100A executes the retained first transmission support program, the CPU 100A implements various sorts of functions described later and additionally, executes various sorts of processes described later. Note that the first transmission support program need only be according to the flowchart illustrated in FIG. 11, which will be described later.

Similarly, when various sorts of functions of the transmission agency server 200 are implemented, and additionally, various sorts of processes of the transmission agency server 200 are executed, the CPU need only execute a second transmission support program. The second transmission support program need only be according to the flowchart illustrated in FIG. 12, which will be described later. When various sorts of functions of the first DB server 300 are implemented, and additionally, various sorts of processes of the first DB server 300 are executed, the CPU need only execute a destination determination program. The destination determination program need only be according to the flowchart illustrated in FIG. 13, which will be described later. Since the second DB server 400 is similar to the first DB server 300, the description thereof will be omitted. When various sorts of functions of the destination resolution server 500 are implemented, and additionally, various sorts of processes of the destination resolution server 500 are executed, the CPU need only execute a destination resolution program. The destination resolution program need only be according to the flowchart illustrated in FIG. 14, which will be described later.

Next, a functional configuration of the control device 100 will be described with reference to FIG. 3. Note that FIG. 3 illustrates the main part of the functions of the control device 100.

Figure 3:
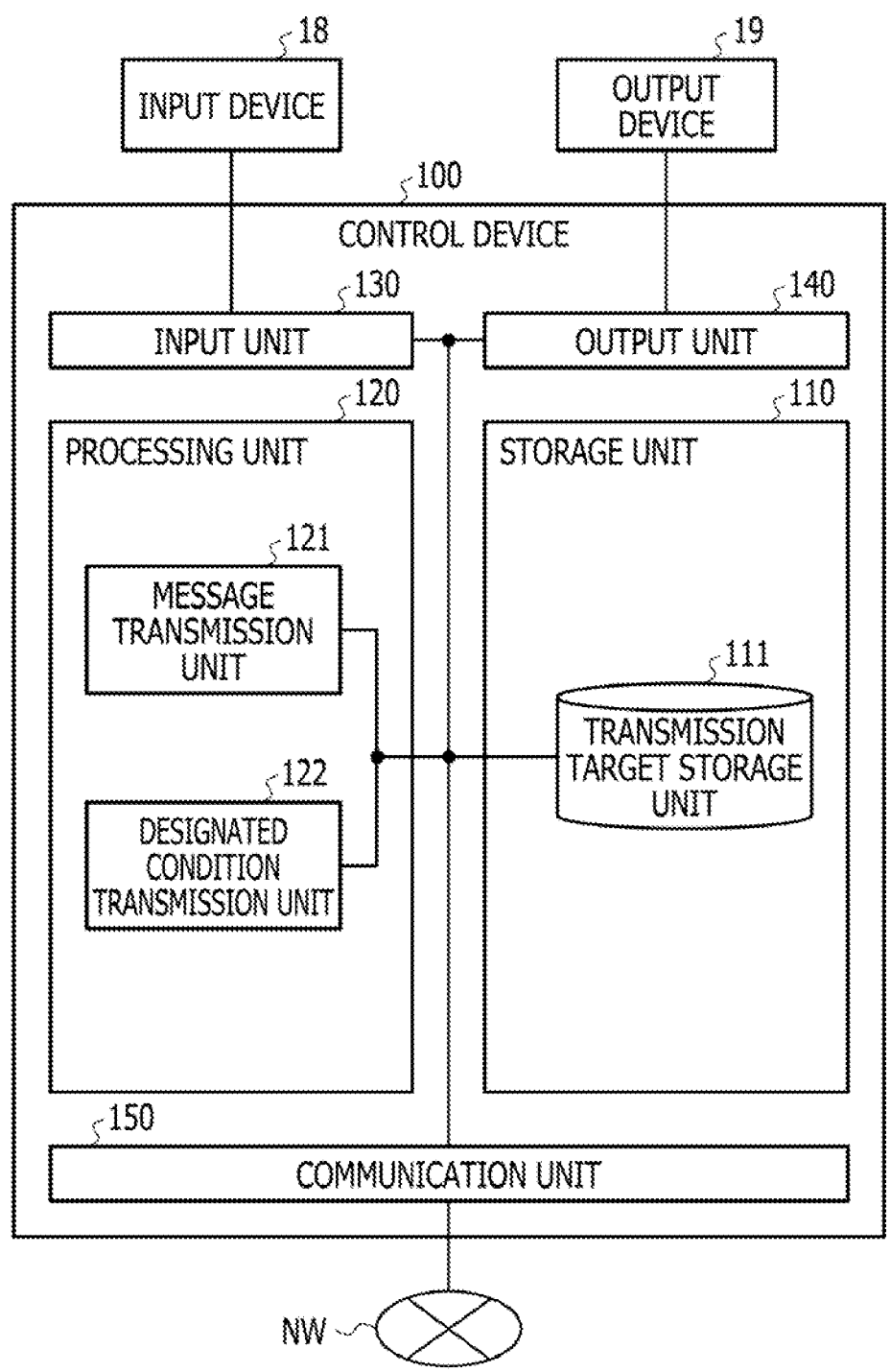
FIG. 3 is an example of the functional configuration of the control device.

As illustrated in FIG. 3, the control device 100 includes a storage unit 110, a processing unit 120, an input unit 130, an output unit 140, and a communication unit 150. The storage unit 110 may be implemented by the RAM 100B, the HDD 100E, or the like described above. The processing unit 120 may be implemented by the CPU 100A described above. The input unit 130 may be implemented by the input I/F 100F described above. The output unit 140 may be implemented by the output I/F 100G described above. The communication unit 150 may be implemented by the network I/F 100D described above. Accordingly, the storage unit 110, the processing unit 120, the input unit 130, the output unit 140, and the communication unit 150 are connected to each other.

Here, the storage unit 110 includes a transmission target storage unit 111. Meanwhile, the processing unit 120 includes a message transmission unit 121 as a first transmission part and a designated condition transmission unit 122 as a second transmission part. When an operation is made on the input devices 18 to input a message and designated conditions, the message transmission unit 121 receives the message and the designated conditions by way of the input unit 130. When receiving the message and the designated conditions, the message transmission unit 121 saves the message and the designated conditions in the transmission target storage unit 111. This causes the transmission target storage unit 111 to store the message and the designated conditions.

When the message and the designated conditions have been saved, the message transmission unit 121 executes a variety of processes described later. The message transmission unit 121 transmits the message to the transmission agency server 200 via the communication unit 150 or stops the transmission of the message, depending on the results of executing the processes. When the transmission of the message is stopped, the message transmission unit 121 makes a notification of the transmission error on the display device 19 via the output unit 140. When the message has been transmitted or the transmission of the message is stopped, the message transmission unit 121 may also delete the message stored in the transmission target storage unit 111. This may relax a tight amount of remaining memory due to the message.

When receiving the management ID from the transmission agency server 200, the designated condition transmission unit 122 acquires the designated conditions from the transmission target storage unit 111. When the designated conditions have been acquired, the designated condition transmission unit 122 transmits the acquired designated conditions and the received management ID in association with each other to the first DB server 300 and the second DB server 400 via the communication unit 150. When the designated conditions have been transmitted, the designated condition transmission unit 122 may also delete the designated conditions stored in the transmission target storage unit 111. This may relax a tight amount of remaining memory due to the designated conditions.

Next, a functional configuration of the transmission agency server 200 will be described with reference to FIGS. 4 and 5. Note that FIG. 4 illustrates the main part of the functions of the transmission agency server 200.

Figure 4:
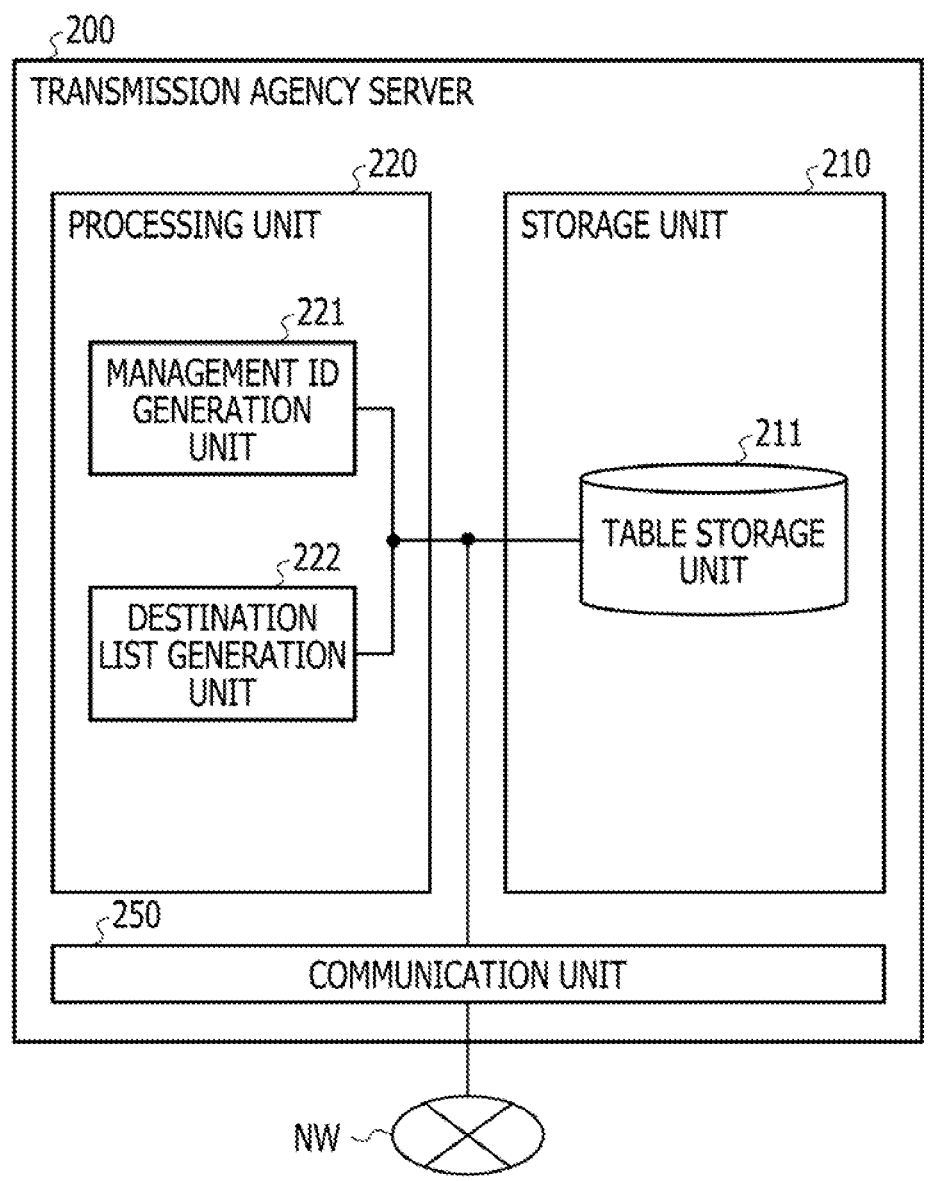
FIG. 4 is an example of the functional configuration of a transmission agency server.

As illustrated in FIG. 4, the transmission agency server 200 includes a storage unit 210, a processing unit 220, and a communication unit 250. Since the hardware configurations of the storage unit 210, the processing unit 220, and the communication unit 250 are basically similar to the hardware configurations of the storage unit 110, the processing unit 120, and the communication unit 150 of the control device 100, detailed description thereof will be omitted. Accordingly, the storage unit 210, the processing unit 220, and the communication unit 250 are connected to each other.

Here, the storage unit 210 includes a table storage unit 211. The processing unit 220 includes a management ID generation unit 221 as a generation part and a destination list generation unit 222 as a specifying part. The management ID generation unit 221 receives the message via the communication unit 250. When receiving the message, the management ID generation unit 221 generates a management ID used for managing the message and returns the generated management ID to the control device 100, which is the transmitter of the message, via the communication unit 250. In addition, the management ID generation unit 221 saves the generated management ID and the received message in the table storage unit 211 in association with each other.

As illustrated in FIG. 5, the management ID and the message are registered and managed in relevant fields of a transmission management table TBL included in the table storage unit 211. The transmission management table TBL manages the above-mentioned user list, a first transmission support program ID, a destination determination program ID, and a received ID, in addition to the management ID and the message. The first transmission support program ID is an identifier that identifies the first transmission support program.

For example, when a message is received from another message transmission terminal (not illustrated) different from the message transmission terminal 10, a different first transmission support program ID is registered in the relevant field of the transmission management table TBL. In the present embodiment, the first transmission support program ID "α" corresponds to the identifier of the first transmission support program installed in the message transmission terminal 10. In addition, the first transmission support program ID "β" corresponds to the identifier of the first transmission support program installed in another message transmission terminal.

The destination determination program ID is basically similar to the case of the first transmission support program ID. For example, when the user list or the like is received from each of the first DB server 300 and the second DB server 400, different destination determination program IDs are registered in the relevant field of the transmission management table TBL. In the present embodiment, the destination determination program ID "A" corresponds to the identifier of the destination determination program installed in the first DB server 300. In addition, the destination determination program ID "B" corresponds to the identifier of the destination determination program installed in the second DB server 400. Note that the received ID will be described later.

When receiving the user lists and the management ID, the destination list generation unit 222 specifies user IDs that are duplicate between the user lists having a common management ID. When the user IDs have been specified, the destination list generation unit 222 generates a destination list including the specified user IDs. When the destination list has been generated, the destination list generation unit 222 transmits the generated destination list and the message received from the control device 100 to the destination resolution server 500 via the communication unit 250.

Figure 6:
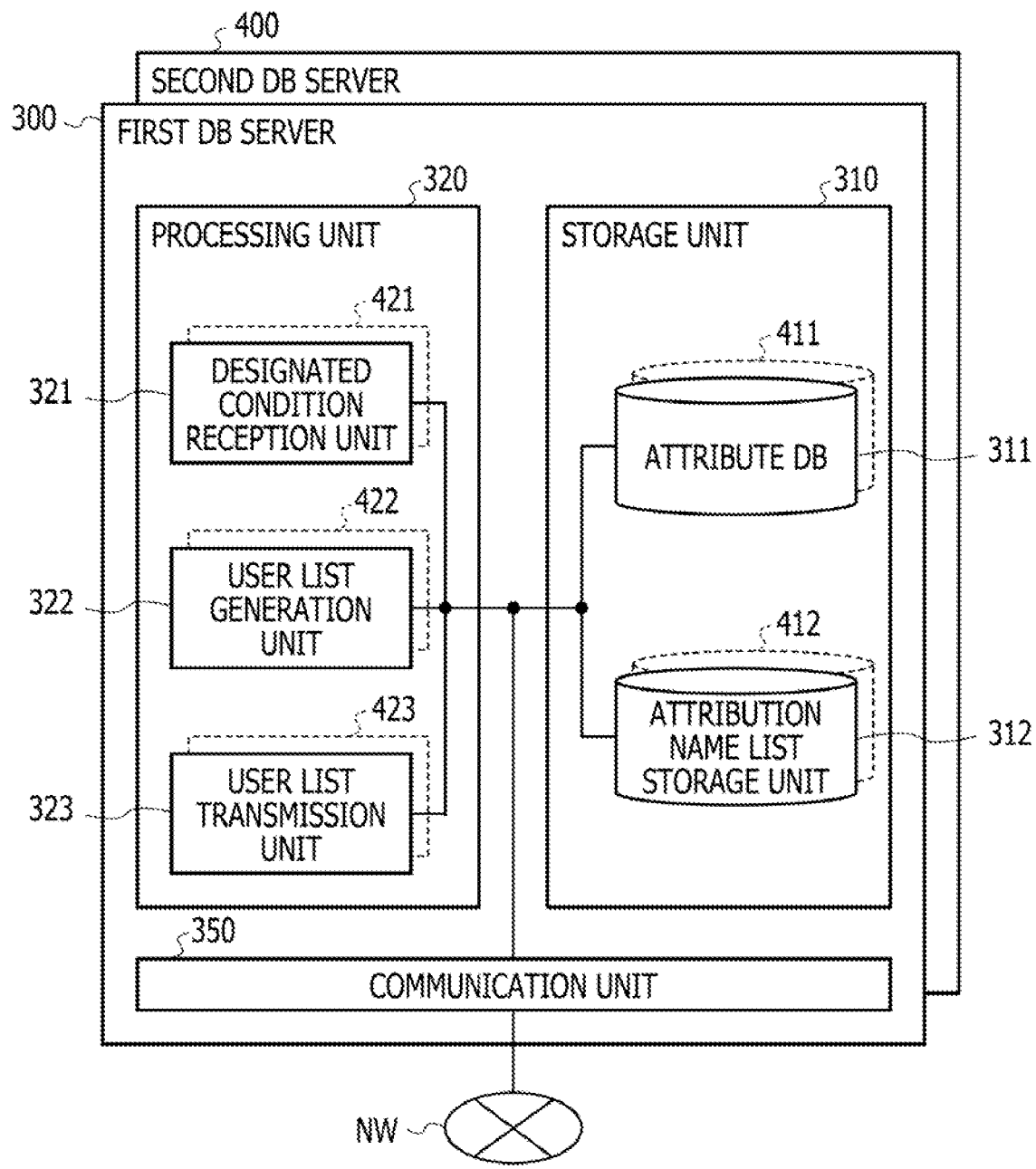
FIG. 6 is an example of the functional configuration of a first database (DB) server and a second DB server.

Next, functional configurations of the first DB server 300 and the second DB server 400 will be described with reference to FIGS. 6 to 8B. Note that FIG. 6 illustrates the main part of the functions of the first DB server 300. In addition, since the functional configuration of the second DB server 400 is basically similar to the functional configuration of the first DB server 300, detailed description thereof will be omitted.

As illustrated in FIG. 6, the first DB server 300 includes a storage unit 310, a processing unit 320, and a communication unit 350. Since the hardware configurations of the storage unit 310, the processing unit 320, and the communication unit 350 are basically similar to the hardware configurations of the storage unit 110, the processing unit 120, and the communication unit 150 of the control device 100, detailed description thereof will be omitted. Accordingly, the storage unit 310, the processing unit 320, and the communication unit 350 are connected to each other.

Here, the storage unit 310 includes an attribute DB 311 and an attribute name list storage unit 312. The processing unit 320 includes a designated condition reception unit 321, a user list generation unit 322, and a user list transmission unit 323. The designated condition reception unit 321 receives the designated conditions and the management ID via the communication unit 350. When the designated condition reception unit 321 receives the designated conditions, the user list generation unit 322 refers to the attribute DB 311 to generate a user list.

Figure 7A:
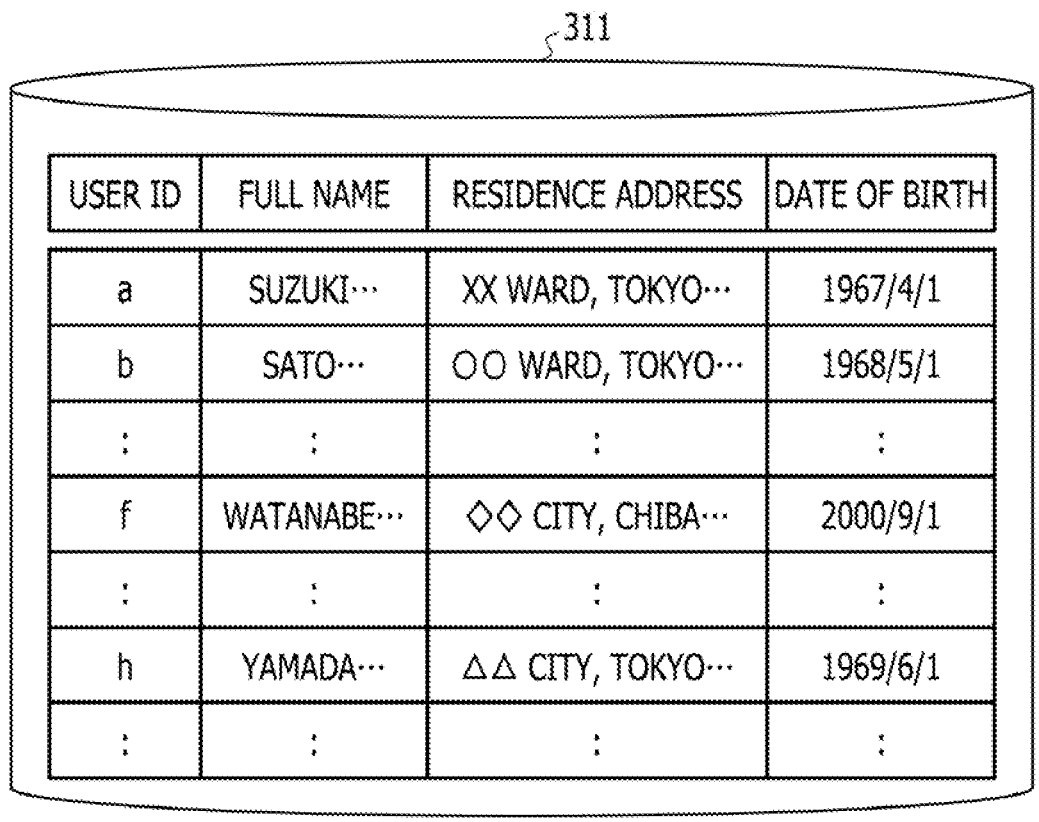
FIG. 7A is an example of an attribute DB of the first DB server.

The attribute DB 311 stores the user ID of the user X2 and the name, residence address, and date of birth relating to the attributes of the user X2, as illustrated in FIG. 7A. Since the designated conditions include a condition regarding an attribute designated by the transmission requester X1, the user list generation unit 322 refers to the attribute DB 311 to specify the user ID according to this condition. When the user ID has been specified, the user list generation unit 322 generates a user list including the specified user ID. The user list transmission unit 323 transmits the user list generated by the user list generation unit 322 together with the management ID to the transmission agency server 200 via the communication unit 350.

Figure 7B:
FIG. 7B is an example of an attribute name list storage unit of the first DB server.

Note that the attribute name list storage unit 312 stores an attribute name list file F1 as illustrated in FIG. 7B. The attribute name list file F1 is an electronic file that represents a list of attributes that can be determined by the first DB server 300. In the present embodiment, the name, residence address, and date of birth are recorded in the attribute name list file F1 as attributes that can be determined by the first DB server 300. The attribute name list file F1 is open to the public in the transmission support system ST, unlike the non-public attribute DB 311. This allows, for example, the control device 100 of the message transmission terminal 10 to refer to the attribute name list file F1.

Figures 8A, 8B:
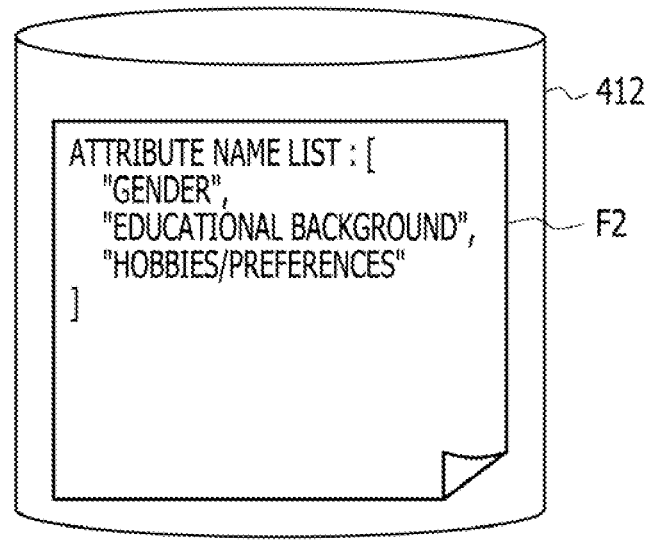
FIG. 8A is an example of an attribute DB of the second DB server.
FIG. 8B is an example of an attribute name list storage unit of the second DB server.

As illustrated in FIG. 8A, an attribute DB 411 of the second DB server 400 stores the user ID of the user X2 and the gender, educational background, and hobbies/preferences relating to the attributes of the user X2. A designated condition reception unit 421 of the second DB server 400 receives the designated conditions and the management ID from the control device 100, similarly to the designated condition reception unit 321. A user list generation unit 422 of the second DB server 400 generates a user list, similarly to the user list generation unit 322. A user list transmission unit 423 of the second DB server 400 transmits the user list together with the management ID to the transmission agency server 200, similarly to the user list transmission unit 323.

Note that the attribute name list storage unit 412 stores an attribute name list file F2 as illustrated in FIG. 8B. The attribute name list file F2 is an electronic file that represents a list of attributes that can be determined by the second DB server 400. In the present embodiment, the gender, educational background, and hobbies/preferences are recorded in the attribute name list file F2 as attributes that can be determined by the second DB server 400. The attribute name list file F2 is open to the public in the transmission support system ST, unlike the non-public attribute DB 411. This allows, for example, the control device 100 of the message transmission terminal 10 to refer to the attribute name list file F2.

Next, a functional configuration of the destination resolution server 500 will be described with reference to FIGS. 9 and 10. Note that FIG. 9 illustrates the main part of the functions of the destination resolution server 500.

Figure 9:
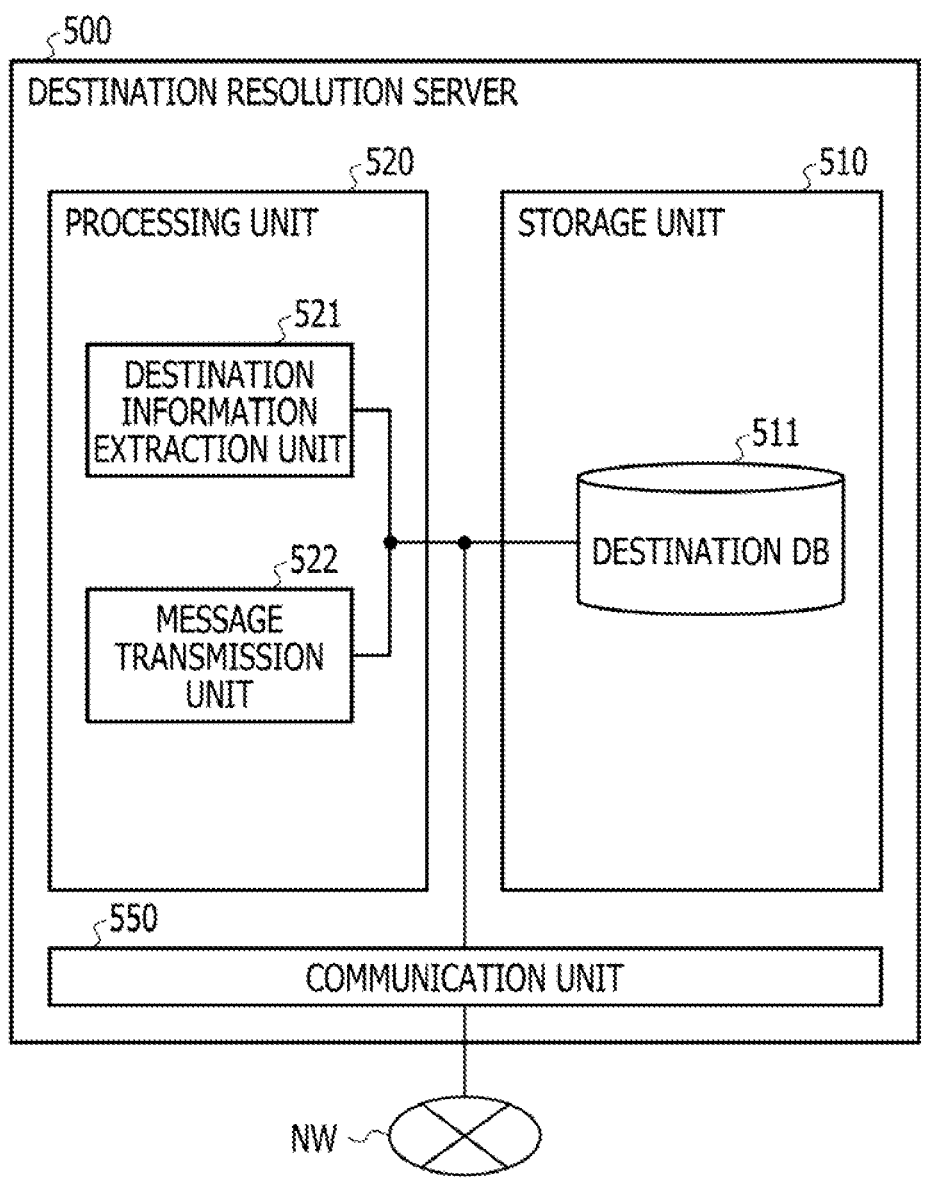
FIG. 9 is an example of the functional configuration of a destination resolution server.

As illustrated in FIG. 9, the destination resolution server 500 includes a storage unit 510, a processing unit 520, and a communication unit 550. Since the hardware configurations of the storage unit 510, the processing unit 520, and the communication unit 550 are basically similar to the hardware configurations of the storage unit 110, the processing unit 120, and the communication unit 150 of the control device 100, detailed description thereof will be omitted. Accordingly, the storage unit 510, the processing unit 520, and the communication unit 550 are connected to each other.

Here, the storage unit 510 includes a destination DB 511. The processing unit 520 includes a destination information extraction unit 521 and a message transmission unit 522. The destination information extraction unit 521 receives the destination list and the message via the communication unit 550. When receiving the destination list, the destination information extraction unit 521 refers to the destination DB 511 to extract the destination information.

Figure 10:
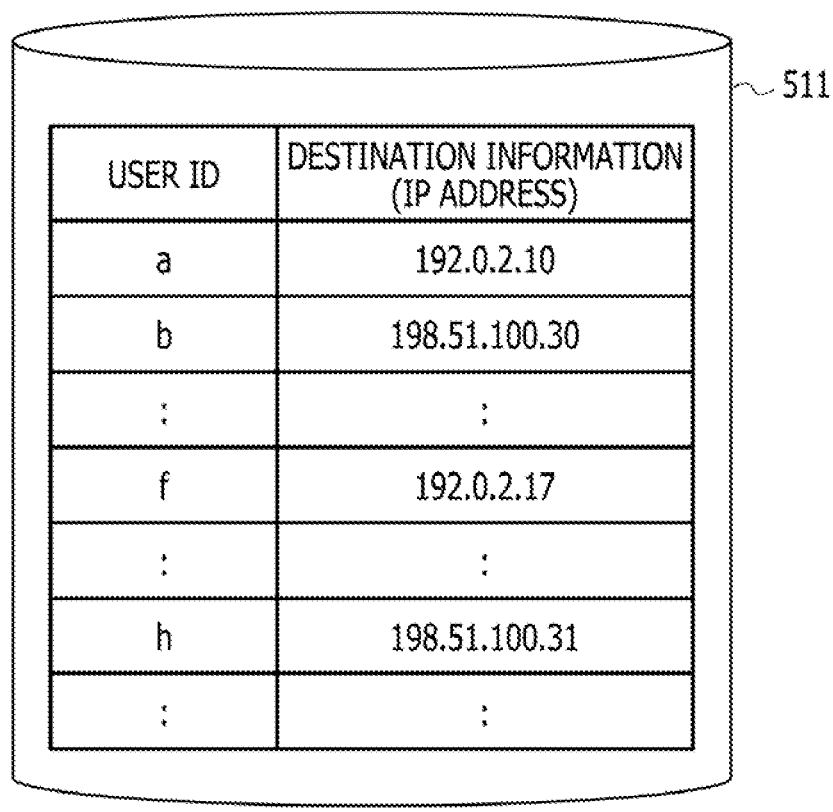
FIG. 10 is an example of a destination DB.

As illustrated in FIG. 10, the destination DB 511 stores the user ID and the destination information of the user X2 in unique correspondence with each other. Since the destination list includes the user ID, the destination information extraction unit 521 refers to the destination DB 511 to extract the destination information according to the user ID included in the destination list. When the destination information extraction unit 521 has extracted the destination information, the message transmission unit 522 transmits the message to the mobile information terminal 20 associated with the extracted destination information via the communication unit 550. This causes the message to reach the mobile information terminal 20 possessed by the user X2 having the attributes according to the designated conditions.

Next, an action of the transmission support system ST will be described with reference to FIGS. 11 to 15.

Figure 11:
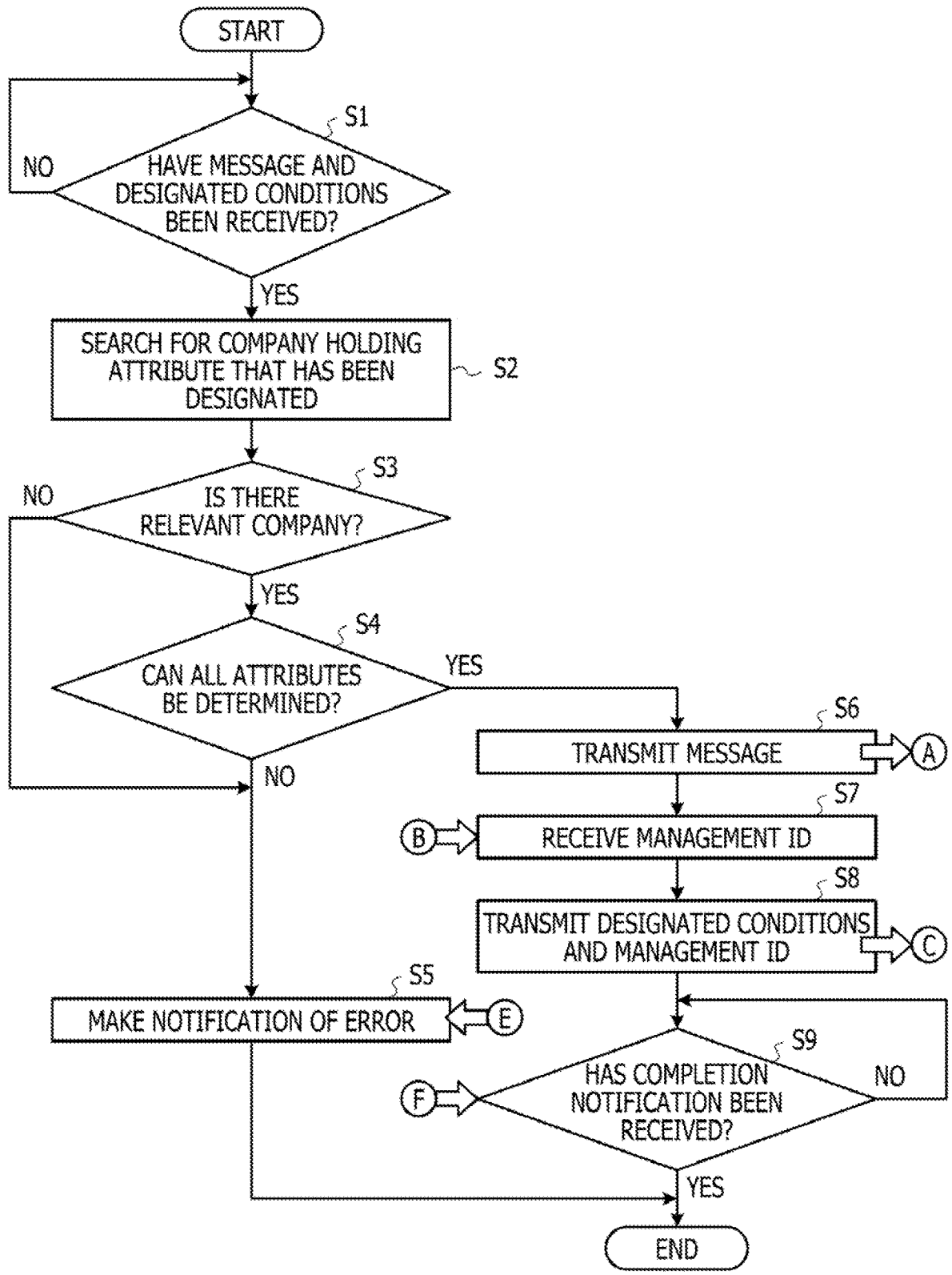
FIG. 11 is a flowchart illustrating an example of a first transmission support process by a first transmission support program.

First, as illustrated in FIG. 11, the message transmission unit 121 waits until a message and designated conditions are received (step S1: NO). When an operation is made by the transmission requester X1 to input a message and designated conditions, the message transmission unit 121 receives the message and the designated conditions (step S1: YES). When receiving the message and the designated conditions, the message transmission unit 121 searches for a company holding an attribute designated by the designated conditions (step S2) and determines whether or not there is a relevant company (step S3).

Figure 15:
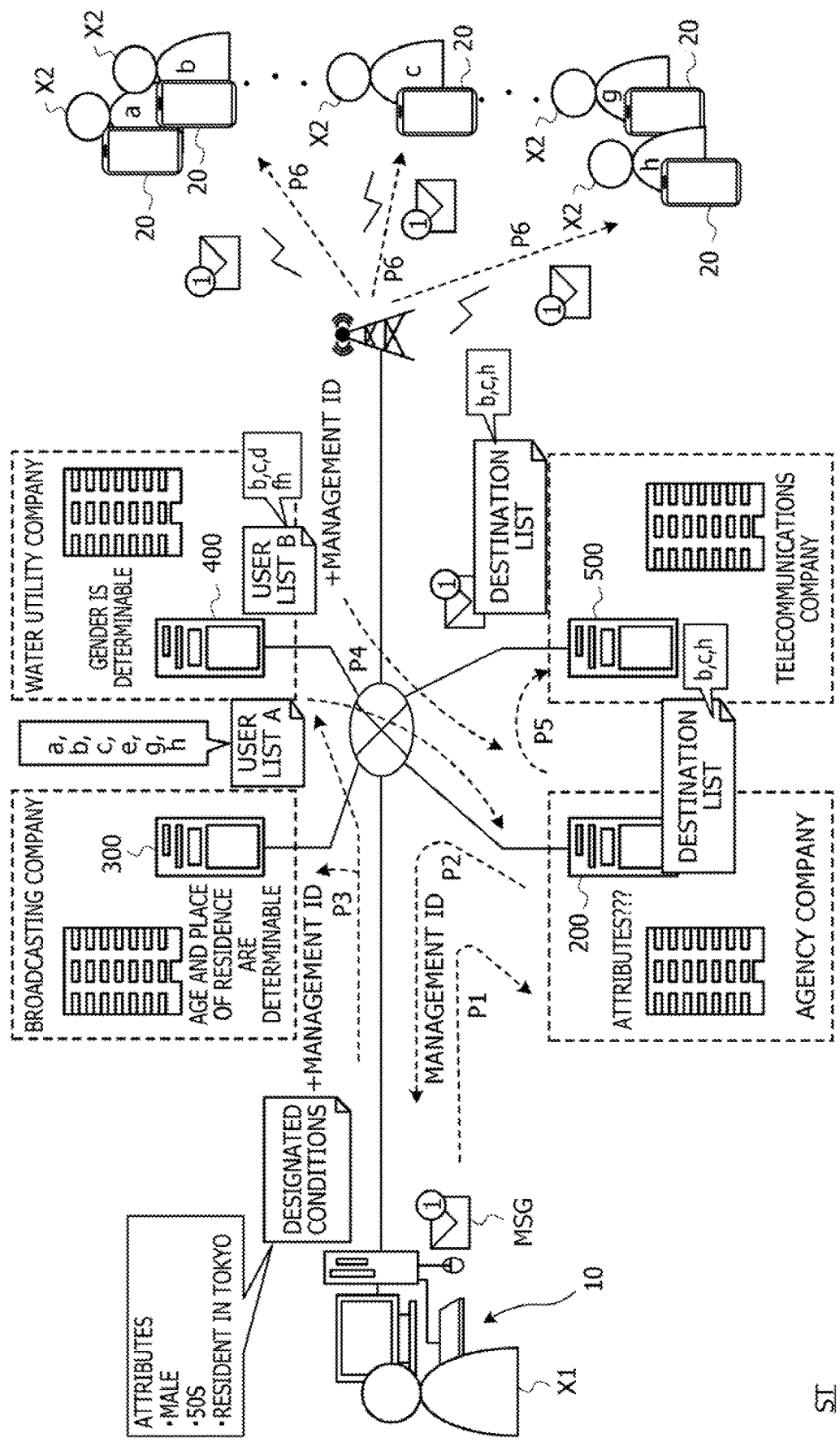
FIG. 15 is a diagram explaining an action example of the transmission support system ST.

For example, first, the message transmission unit 121 refers to the attribute name list files F1 and F2 open to the public in the transmission support system ST. When referring to the attribute name list files F1 and F2, the message transmission unit 121 determines whether or not at least a part of the attributes designated by the designated conditions is included in the attribute name list files F1 and F2. For example, when receiving designated conditions in which three conditions are designated as conditions for the attributes of the users X2 together with the message, the message transmission unit 121 refers to the attribute name list files F1 and F2. In the present embodiment, as illustrated in FIG. 15, a case where the gender is male, the age is in the 50s, and the place of residence is in Tokyo as a resident is adopted as the three conditions.

In this case, since the residence address and the date of birth are recorded in the attribute name list file F1, the place of residence and the age can be determined. Since the attribute name list file F1 is managed by the broadcasting company, the message transmission unit 121 determines that there is a relevant company. In addition, since the gender is recorded in the attribute name list file F2, the gender can be determined. Since the attribute name list file F2 is managed by the water utility company, the message transmission unit 121 determines that there is a relevant company.

When there is a relevant company (step S3: YES), the message transmission unit 121 determines whether or not all the attributes included in the designated conditions can be determined (step S4). For example, it is determined whether or not there is an attribute that is not held by any company among the attributes included in the designated conditions. When none of the attributes included in the designated conditions can be determined (step S4: NO), or when there is no relevant company in the process in step S3 (step S3: NO), the message transmission unit 121 makes a notification of the transmission error on the display device 19 (step S5).

When all the attributes included in the designated conditions can be determined (step S4: YES), the message transmission unit 121 transmits a message (step S6). In more detail, the message transmission unit 121 transmits a message MSG to the transmission agency server 200, as illustrated in FIG. 15 (arrow P1). When transmitting the message MSG, the message transmission unit 121 simultaneously transmits the first transmission support program ID and the destination determination program ID.

The first transmission support program ID is an identifier that identifies the first transmission support program that represents the transmitter of the message MSG. In the present embodiment, the first transmission support program ID "α" is assigned to the first transmission support program installed in the control device 100 of the message transmission terminal 10. Meanwhile, the destination determination program ID is an identifier that identifies the destination determination program. In the present embodiment, the destination determination program ID "A" is assigned to the destination determination program installed in the first DB server 300. The destination determination program ID "B" is assigned to the destination determination program installed in the second DB server 400. In the process in step S3, when there is a relevant company, the message transmission unit 121 can acquire the destination determination program ID corresponding to the relevant company.

Figure 12:
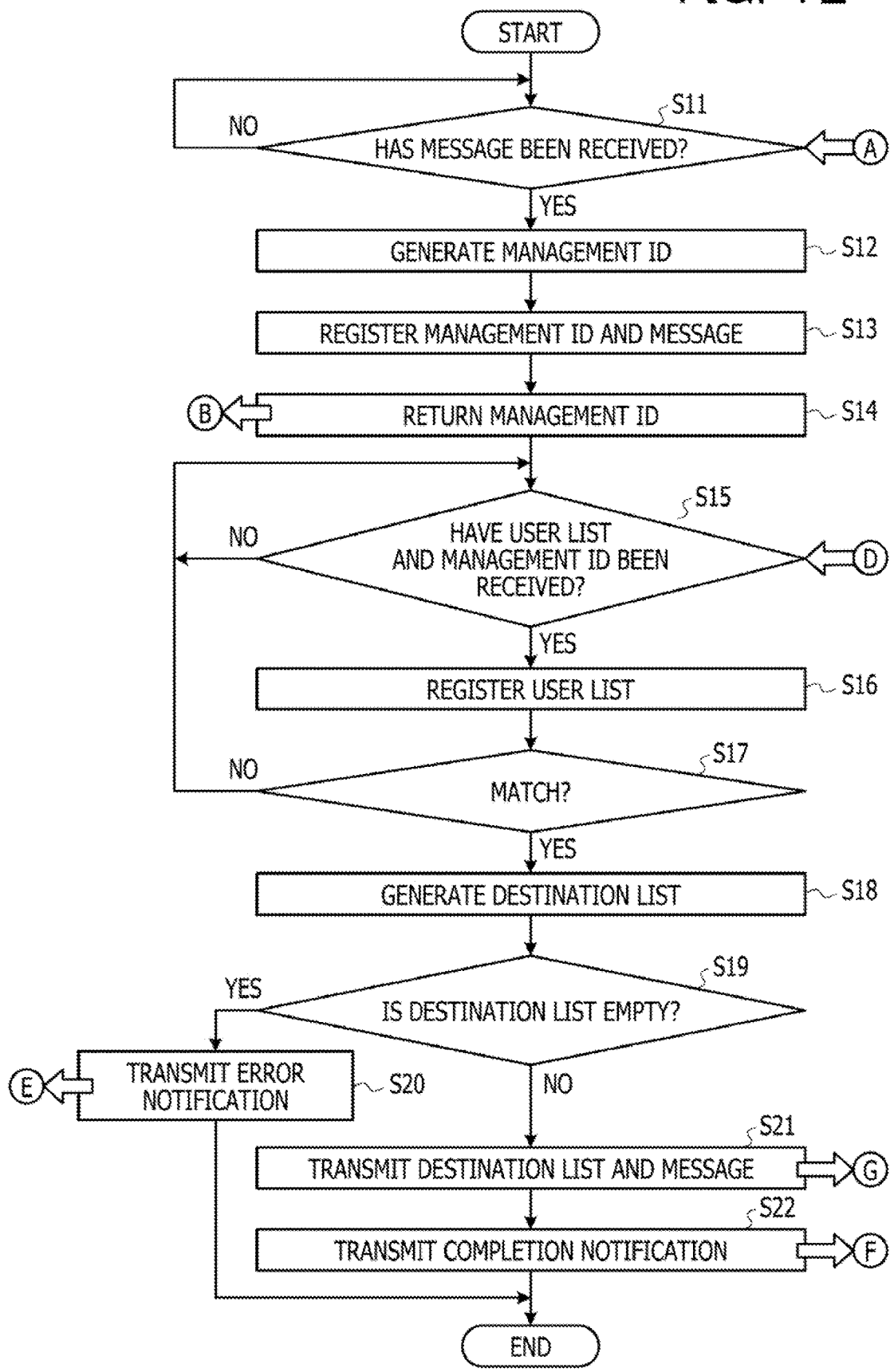
FIG. 12 is a flowchart illustrating an example of a second transmission support process by a second transmission support program.

In the transmission agency server 200, as illustrated in FIG. 12, the management ID generation unit 221 waits until the message is received (step S11: NO). When receiving the message (step S11: YES), the management ID generation unit 221 generates the management ID (step S12). For example, if the management ID "1" has been registered in the relevant field of the transmission management table TBL (refer to FIG. 5), the management ID generation unit 221 generates the management ID "2" consecutive to the management ID "1".

When the management ID has been generated, the management ID generation unit 221 registers the management ID and the message (step S13). In more detail, the management ID generation unit 221 registers the management ID, the message, and the first transmission support program ID and the destination determination program ID received together with the message in the relevant fields of the transmission management table TBL. In the present embodiment, the management ID generation unit 221 registers the management ID "2", the message "[message 1]", the first transmission support program ID "α", and the destination determination program IDs "A, B" in the relevant fields of the transmission management table TBL in association with each other (refer to FIG. 5).

When the management ID and the message have been registered, the management ID generation unit 221 returns the management ID (step S14). In more detail, the management ID generation unit 221 returns the management ID to the control device 100 of the message transmission terminal 10 (arrow P2), as illustrated in FIG. 15. In the control device 100, as illustrated in FIG. 11, the designated condition transmission unit 122 receives the management ID (step S7). When receiving the management ID, the designated condition transmission unit 122 transmits the designated conditions and the management ID (step S8). In more detail, the designated condition transmission unit 122 transmits the designated conditions and the management ID to the first DB server 300 and the second DB server 400 (arrow P3), as illustrated in FIG. 15. When the designated conditions and the management ID have been transmitted, the designated condition transmission unit 122 waits until a completion notification for transmission is received from the transmission agency server 200 (step S9: NO).

Figure 13:
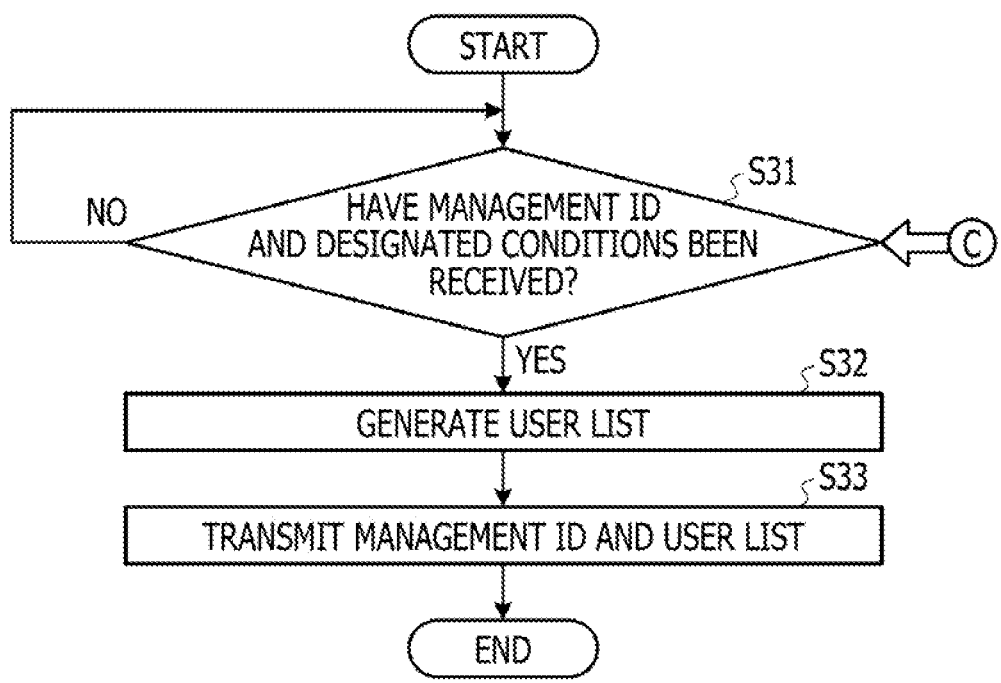
FIG. 13 is a flowchart illustrating an example of a destination determination process by a destination determination program.

In the first DB server 300, as illustrated in FIG. 13, the designated condition reception unit 321 waits until the designated conditions and the management ID are received (step S31: NO). When the designated conditions and the management ID have been received (step S31: YES), the user list generation unit 322 generates the user list (step S32). As illustrated in FIG. 15, the first DB server 300 can determine the age and the place of residence. Therefore, among the three conditions designated in the designated conditions, the user ID of the user X2 according to the conditions that the age is in the 50s and the place of residence is in Tokyo as a resident can be specified. The user list generation unit 322 refers to the attribute DB 311 (FIG. 7A) to specify the user ID that meets the conditions for age and place of residence. In the present embodiment, as illustrated in FIG. 15, the user IDs "a, b, c, e, g, h" are specified. When the user IDs have been specified, the user list generation unit 322 generates a user list that includes the specified user IDs but does not include the attributes that the users X2 with the specified user IDs have. In the present embodiment, as illustrated in FIG. 15, the user list generation unit 322 generates a user list "A" including the user IDs "a, b, c, e, g, h".

When the user list has been generated, the user list transmission unit 323 transmits the management ID and the user list (step S33). In more detail, as illustrated in FIG. 15, the user list transmission unit 323 transmits a combination of the user list "[user list A]", the management ID "2" (not illustrated), and the destination determination program ID "A" to the transmission agency server 200 (arrow P4). When the management ID and the user list have been transmitted, the user list transmission unit 323 ends the process.

Also in the second DB server 400, similarly to the first DB server 300, the designated condition reception unit 421 waits until the designated conditions and the management ID are received. When the designated conditions and the management ID have been received, the user list generation unit 422 generates the user list. As illustrated in FIG. 15, the second DB server 400 can determine the gender. Therefore, among the three conditions designated in the designated conditions, the user ID of the user X2 according to the condition that the gender is male can be specified. The user list generation unit 422 refers to the attribute DB 411 (FIG. 8A) to specify a user ID that meets the condition for gender. In the present embodiment, as illustrated in FIG. 15, the user IDs "b, c, d, f, h" are specified. When the user IDs have been specified, the user list generation unit 422 generates a user list that includes the specified user IDs but does not include the attributes that the users X2 with the specified user IDs have. In the present embodiment, as illustrated in FIG. 15, the user list generation unit 422 generates a user list "B" including the user IDs "b, c, d, f, h".

When the user list has been generated, the user list transmission unit 423 transmits the management ID and the user list. In more detail, as illustrated in FIG. 15, the user list transmission unit 423 transmits a combination of the user list "[user list B]", the management ID "2", and the destination determination program ID "B" to the transmission agency server 200 (arrow P4). When the management ID and the user list have been transmitted, the user list transmission unit 423 ends the process.

In the transmission agency server 200, as illustrated in FIG. 12, the destination list generation unit 222 waits until the user list and the management ID are received (step S15: NO). When receiving the user list and the management ID (step S15: YES), the destination list generation unit 222 registers the user list (step S16). In more detail, each time the combination of the user list, the management ID, and the destination determination program ID is received, the destination list generation unit 222 accesses the transmission management table TBL (refer to FIG. 5). When accessing the transmission management table TBL, the destination list generation unit 222 searches for a management ID that matches the received management ID.

When a management ID that matches the received management ID has been found, the destination list generation unit 222 registers the received user list in a user list corresponding to the found management ID. In the present embodiment, the user list "A" is transmitted from the first DB server 300, and the user list "B" is transmitted from the second DB server 400. Therefore, the destination list generation unit 222 registers [user list A] and [user list B] in the field of the user list corresponding to the management ID "2". Here, the user list includes the user ID but does not include the attributes that the user X2 assigned with the included user ID has. Therefore, as illustrated in FIG. 15, the agency company is not allowed to grasp the attributes that the user X2 has. In this manner, the personal information and privacy information of the user X2 may be protected.

In addition, when a management ID that matches the received management ID has been found, the destination list generation unit 222 registers the received destination determination program ID in the field of the received ID corresponding to the found management ID. In the present embodiment, the destination determination program ID "A" is transmitted from the first DB server 300, and the destination determination program ID "B" is transmitted from the second DB server 400. Therefore, the destination list generation unit 222 registers the destination determination program IDs "A, B" in the field of the received ID corresponding to the management ID "2".

When the user list has been registered, the destination list generation unit 222 determines whether or not the destination determination program ID and the received ID in the transmission management table TBL match (step S17). For example, a gap is sometimes produced between timings of receiving the user list transmitted from the first DB server 300 and the user list transmitted from the second DB server 400. In this case, there is a possibility that the destination determination program IDs "A, B" are registered in the field of the destination determination program ID, and the received ID "A" is registered in the field of the received ID but the received ID "B" is not registered in the field of the received ID. When the destination determination program ID and the received ID do not match (step S17: NO), the destination list generation unit 222 goes back to the process in step S15. This may avoid the subsequent processes from starting with the lack of the destination determination program ID.

When the destination determination program ID and the received ID match (step S17: YES), the destination list generation unit 222 generates the destination list (step S18). In more detail, the destination list generation unit 222 specifies user IDs that are duplicate between the user lists and generates a destination list including the specified user IDs. In the present embodiment, as illustrated in FIG. 15, the user list "A" includes the user IDs "a, b, c, e, g, h". The user list "B" includes the user IDs "b, c, d, f, h". Accordingly, as illustrated in FIG. 15, the destination list generation unit 222 specifies the user IDs "b, c, h" that are duplicate in the user list "A" and the user list "B" and generates a destination list including these user IDs "b, c, h".

When the destination list has been generated, the destination list generation unit 222 determines whether or not the destination list is empty (step S19). When the destination list is empty (step S19: YES), the destination list generation unit 222 transmits an error notification (step S20). In more detail, the destination list generation unit 222 transmits an error notification to the control device 100 of the message transmission terminal 10. This causes the message transmission unit 121 to make a notification of the transmission error on the display device 19 as the process in step S5, as illustrated in FIG. 11.

When the destination list is not empty (step S19: NO), the destination list generation unit 222 transmits the destination list and the message (step S21). In the present embodiment, as described above, since the destination list includes the user IDs "b, c, h", the destination list generation unit 222 determines that the destination list is not empty. Accordingly, as illustrated in FIG. 15, the destination list generation unit 222 transmits the destination list and the message to the destination resolution server 500 (arrow P5).

When the destination list and the message have been transmitted, the destination list generation unit 222 transmits a completion notification for transmission (step S22). In more detail, the destination list generation unit 222 transmits a completion notification to the control device 100 of the message transmission terminal 10. Along with the transmission of the completion notification, the destination list generation unit 222 may also transmit the number of user IDs included in the destination list to the control device 100. As illustrated in FIG. 11, the control device 100 waits until the completion notification is received in the process in step S9, and when the completion notification has been received (step S9: YES), the designated condition transmission unit 122 ends the process. Note that, when the number of user IDs has been received, the designated condition transmission unit 122 may also make a notification of the number of user IDs on the display device 19.

Figure 14:
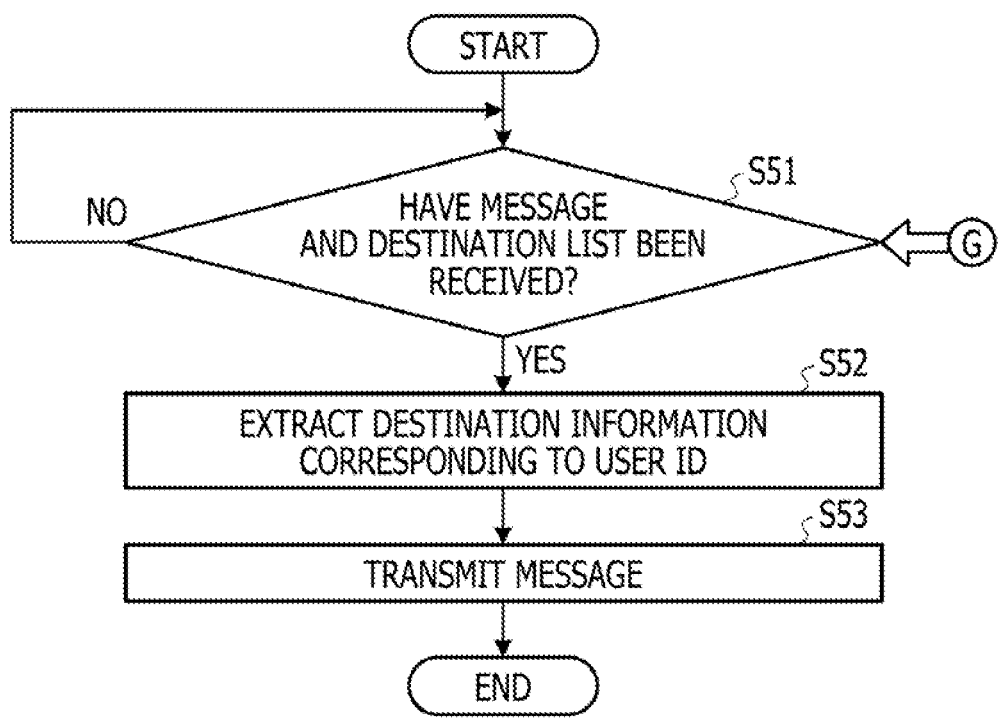
FIG. 14 is a flowchart illustrating an example of a destination resolution process by a destination resolution program.

In the destination resolution server 500, as illustrated in FIG. 14, the destination information extraction unit 521 waits until the message and the destination list are received (step S51: NO). When receiving the message and the destination list (step S51: YES), the destination information extraction unit 521 extracts the destination information corresponding to the user ID (step S52). In more detail, the destination information extraction unit 521 searches the destination DB 511 (refer to FIG. 10) based on the user ID included in the destination list and extracts the destination information corresponding to the user ID. In the present embodiment, the user IDs "b, c, h" are included in the destination list. Therefore, the destination information extraction unit 521 extracts the destination information corresponding to the user IDs "b, c, h" from the destination DB 511.

When the destination information has been extracted, the message transmission unit 522 transmits the message (step S53). In more detail, the message transmission unit 522 transmits the message to the mobile information terminal 20 associated with the extracted destination information. This causes the message to reach the mobile information terminals 20 possessed by the users X2 with the user IDs "b, c, h" (arrow P6), as illustrated in FIG. 15. When the message has been transmitted, the message transmission unit 522 ends the process. In this manner, the message reaches the users X2 having the attributes according to the designated conditions, and the message is avoided from reaching the users X2 by including even an attribute that is not according to the designated conditions. When costs are incurred in proportion to the number of reaches (or the number of destinations) of messages, the incurrence of wasteful costs may be suppressed.

Second Embodiment

Subsequently, a second embodiment of the present embodiments will be described. In the first embodiment described above, the broadcasting company and the water utility company each hold the user ID, but may also hold the destination information of the user X2, instead of the user ID. The destination information may also be a mail address of an electronic mail or a phone number assigned to the mobile information terminal 20. For example, the electronic mail address or phone number of the user X2 may also be registered in an attribute DB 311 of a first DB server 300 managed by the broadcasting company. In addition, the electronic mail address or phone number of the user X2 may also be registered in an attribute DB 411 of a second DB server 400 managed by the water utility company.

This causes the user list "A" and the user list "B" described in the first embodiment to include the destination information instead of the user ID. In this case, user list transmission units 323 and 423 transmit the user list "A" and the user list "B" including the destination information to a transmission agency server 200 together with the management ID, respectively.

Accordingly, in the transmission agency server 200, a destination list generation unit 222 specifies pieces of the destination information that are duplicate between the user lists. In the first embodiment, thereafter, the destination list generation unit 222 generates a destination list including the specified destination information and transmits the generated destination list to the destination resolution server 500 together with the message. However, in the second embodiment, since the destination information has already been specified, the destination is no longer have to be resolved. For example, the process of extracting the destination information corresponding to the user ID by the destination resolution server 500 may be omitted. In the case of the second embodiment, the message to a mobile information terminal 20 may be directly transmitted from the transmission agency server 200 without including a destination resolution server 500 in a transmission support system ST.

Third Embodiment

Subsequently, a third embodiment of the present embodiments will be described. In the first embodiment described above, the telecommunications company holds the IP address as the destination information, but a postal company may also be adopted instead of the telecommunications company such that the residence address and name of the user X2 are held instead of the IP address. For example, the residence address and name of the user X2 may also be registered in a destination DB 511 of a destination resolution server 500 managed by the postal company.

In this case, a control device 100 of a message transmission terminal 10, which is the transmitter of the message, transmits print data including the message to the destination resolution server 500. The print data is data for printing a message or the like on a postal item. Meanwhile, similarly to the first embodiment, a transmission agency server 200 transmits the destination list including user IDs that are duplicate between the user lists, to the destination resolution server 500. This allows the destination information extraction unit 521 to extract the residence address and the name based on the user ID included in the destination list. In the third embodiment, since the destination resolution server 500 is managed by the postal company, the message may be printed on the postal item based on the print data, and additionally, the extracted residence address and name may be printed on the postal item. The postal company can send the postal item on which the message, residence address, and name are printed to the user X2. Note that, in the case of the third embodiment, the transmission of the message to the destination resolution server 500 from the transmission agency server 200 may also be stopped. In this manner, according to the third embodiment, while protecting the personal information and the like of the user X2, a physical postal item may be mailed to the user X2 having attributes according to the designated conditions, instead of the electronic message.

In addition, in the first embodiment described above, the telecommunications company holds the IP address as the destination information, but a delivery company may also be adopted instead of the telecommunications company such that the residence address and name of the user X2 are held instead of the IP address. For example, the residence address and name of the user X2 may also be registered in the destination DB 511 of the destination resolution server 500 managed by the delivery company.

In this case, the destination list generation unit 222 generates a destination list including user IDs that are duplicate between the user lists and then notifies the control device 100, which is the transmitter of the message, of the number of user IDs included in the destination list. The transmission requester X1 prepares the notified number of delivery objects and sends the prepared delivery objects to the delivery company using a courier company or the like. Examples of the delivery objects include parcels or the like. Meanwhile, similarly to the first embodiment, a transmission agency server 200 transmits the destination list including user IDs that are duplicate between the user lists, to the destination resolution server 500. This allows the destination information extraction unit 521 to extract the residence address and the name based on the user ID included in the destination list.

Since the destination resolution server 500 is managed by the delivery company, when the delivery objects have been handed over from the transmission requester X1 to the delivery company, the delivery company attaches slips on which the extracted residence addresses and names are written down, to the delivery objects. This allows the delivery objects to be sent to the users X2. Note that, in this case as well, the transmission of the message to the destination resolution server 500 from the transmission agency server 200 may also be stopped. In this manner, also when the delivery company is adopted, while protecting the personal information and the like of the user X2, a physical delivery object may be mailed to the user X2 having attributes according to the designated conditions, instead of the electronic message.

Fourth Embodiment

Subsequently, a fourth embodiment of the present embodiments will be described. In the first embodiment described above, it has been described that the destination list generation unit 222 specifies user IDs that are duplicate between the user lists having a common management ID and generates a destination list including the specified user IDs. In the fourth embodiment, a destination list generation unit 222 specifies a first number of identifiers, which is the number of user IDs that are duplicate between user lists having a common management ID. For example, if the user IDs that are duplicate between the user lists having a common management ID are the user IDs "b, c, h", the destination list generation unit 222 specifies the first number of identifiers "3".

In addition, the destination list generation unit 222 specifies a second number of identifiers, which is the number of identifiers in a union of the user IDs of the users X2 separately held by the broadcasting company and the water utility company. For example, it is assumed that user IDs "a, b, c, d, e, f, g, h" are included in an attribute DB 311 (refer to FIG. 7A) of a first DB server 300 managed by the broadcasting company. Meanwhile, it is assumed that user IDs "a, b, c, d, e, f, g, h, i, j" are included in an attribute DB 411 (refer to FIG. 8A) of a second DB server 400 managed by the water utility company. In this case, since the union of the two sets of user IDs is user IDs "a, b, c, d, e, f, g, h, i, j", the destination list generation unit 222 specifies the second number of identifiers "10".

When the first number of identifiers and the second number of identifiers have been specified, the destination list generation unit 222 transmits the ratio of the first number of identifiers to the second number of identifiers to a control device 100 of a message transmission terminal 10, which is the transmitter. In the case of the present embodiment, the destination list generation unit 222 transmits the ratio "0.3", the ratio "30%", or the like to the control device 100. In the control device 100, since the designated condition transmission unit 122 receives the ratio and makes a notification on a display device 19, the transmission requester X1 is allowed to confirm to what extent of the ratio the message has been transmitted.

Although the preferred embodiments have been described in detail thus far, the present embodiments are not limited to specific embodiments, and various modifications and alterations may be made within the scope of the present embodiments described in the claims. For example, various sorts of the servers described above may also be implemented by physical servers or virtual servers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a transmission support program that causes at least one computer to execute a process, the process comprising:
generating a management identifier of a message in response to reception of the message;
returning the management identifier to a transmitter of the message;
receiving, from each of a plurality of companies that receives the management identifier from the transmitter of the message, generates a list of personal identifiers of individuals whose attributes meet a condition regarding personal attributes and transmits the management identifier and the list, the management identifier and the list;
specifying one or more personal identifiers that exist in two or more lists that are included in lists received from the plurality of companies and have a same management identifier; and
transmitting the specified one or more personal identifiers and the received message.

2. The non-transitory computer-readable storage medium according to claim 1, wherein the plurality of companies holds destinations of the individuals as the personal identifiers and transmits the lists of the destinations and the management identifier, wherein the specifying includes when receiving the lists of the destinations and the management identifier from each of the plurality of companies, specifying one or more destinations that exist in two or more lists that are included in lists received from the plurality of companies and have a same management identifier, and the transmitting includes transmitting the received message to the specified one or more destinations.

3. The non-transitory computer-readable storage medium according to claim 1, wherein the transmitter transmits print data that includes the message to be printed on postal items to a postal company that holds information involved to mail the postal items to the individuals in association with the personal identifiers, wherein the transmitting includes stopping transmission of the received message to transmit the specified one or more personal identifiers to the postal company.

4. The non-transitory computer-readable storage medium according to claim 1, wherein the specifying includes notifying the transmitter of a number of the specified one or more personal identifiers, wherein the transmitter sends the notified number of delivery objects to a delivery company that holds information involved to deliver the delivery objects to the individuals in association with the personal identifiers, and the transmitting includes stopping transmission of the received message to transmit the specified personal identifiers to the delivery company.

5. The non-transitory computer-readable storage medium according to claim 1, wherein the specifying includes specifying a first number that is a number of the specified one or more personal identifiers and a second number that is a number of identifiers in a union of the personal identifiers of the individuals separately held by the plurality of companies, and the transmitting includes transmitting a ratio of the first number to the second number to the transmitter.

6. The non-transitory computer-readable storage medium according to claim 1, wherein the process further comprising: when receiving a message and conditions regarding attributes of individuals from a transmission requester of the message, transmitting the message to a first company that transmits the message to the individuals as an agency of the transmission requester; and when receiving a management identifier of the message generated by the first company in response to reception of the message from the first company, transmitting the conditions and the management identifier to each of a plurality of second companies that holds information on the attributes, wherein the plurality of second companies transmits lists of personal identifiers of the individuals who have the attributes according to the conditions and the management identifier to the first company, and the first company specifies the one or more personal identifiers that exist in two or more lists that are included in lists received from the plurality of second companies and have a same management identifier, and transmits the specified one or more personal identifiers and the received message.

7. A transmission support device comprising:
one or more memories; and
one or more processors coupled to the one or more memories and the one or more processors configured to:
generate a management identifier of a message in response to reception of the message,
return the management identifier to a transmitter of the message,
receiving, from each of a plurality of companies that receives the management identifier from the transmitter of the message, generates a list of personal identifiers of individuals whose attributes meet a condition regarding personal attributes and transmits the management identifier and the list, the management identifier and the list,
specify the one or more personal identifiers that exist in two or more lists that are included in lists received from the plurality of companies and have a same management identifier, and
transmit the specified one or more personal identifiers and the received message.

8. The transmission support device according to claim 7, wherein the plurality of companies holds destinations of the individuals as the personal identifiers and transmits the lists of the destinations and the management identifier, wherein the one or more processors are further configured to: when receiving the lists of the destinations and the management identifier from each of the plurality of companies, specify one or more destinations that exist in two or more lists that are included in lists received from the plurality of companies and have a same management identifier, and transmit the received message to the specified one or more destinations.

9. The transmission support device according to claim 7, wherein the transmitter transmits print data that includes the message to be printed on postal items to a postal company that holds information involved to mail the postal items to the individuals in association with the personal identifiers, wherein the one or more processors are further configured to stop transmission of the received message to transmit the specified one or more personal identifiers to the postal company.

10. The transmission support device according to claim 7, wherein the one or more processors are further configured to notify the transmitter of a number of the specified one or more personal identifiers, wherein the transmitter sends the notified number of delivery objects to a delivery company that holds information involved to deliver the delivery objects to the individuals in association with the personal identifiers, wherein the one or more processors are further configured to stop transmission of the received message to transmit the specified personal identifiers to the delivery company.

11. The transmission support device according to claim 7, wherein the one or more processors are further configured to: specify a first number that is a number of the specified one or more personal identifiers and a second number that is a number of identifiers in a union of the personal identifiers of the individuals separately held by the plurality of companies, and transmit a ratio of the first number to the second number to the transmitter.

12. The transmission support device according to claim 7, wherein the one or more processors are further configured to: when receiving a message and conditions regarding attributes of individuals from a transmission requester of the message, transmit the message to a first company that transmits the message to the individuals as an agency of the transmission requester, and when receiving a management identifier of the message generated by the first company in response to reception of the message from the first company, transmit the conditions and the management identifier to each of a plurality of second companies that holds information on the attributes, wherein the plurality of second companies transmits lists of personal identifiers of the individuals who have the attributes according to the conditions and the management identifier to the first company, and the first company specifies the one or more personal identifiers that exist in two or more lists that are included in lists received from the plurality of second companies and have a same management identifier, and transmits the specified one or more personal identifiers and the received message.

13. A transmission support method for a computer to execute a process comprising:
   generating a management identifier of a message in response to reception of the message;
   returning the management identifier to a transmitter of the message;
   receiving, from each of a plurality of companies that receives the management identifier from the transmitter of the message, generates a list of personal identifiers of individuals whose attributes meet a condition regarding personal attributes and transmits the management identifier and the list, the management identifier and the list;
   specifying the one or more personal identifiers that exist in two or more lists that are included in lists received from the plurality of companies and have a same management identifier; and
   transmitting the specified one or more personal identifiers and the received message.

14. The transmission support method according to claim 13, wherein the plurality of companies holds destinations of the individuals as the personal identifiers and transmits the lists of the destinations and the management identifier, wherein the specifying includes when receiving the lists of the destinations and the management identifier from each of the plurality of companies, specifying one or more destinations that exist in two or more lists that are included in lists received from the plurality of companies and have a same management identifier, and the transmitting includes transmitting the received message to the specified one or more destinations.

15. The transmission support method according to claim 13, wherein the transmitter transmits print data that includes the message to be printed on postal items to a postal company that holds information involved to mail the postal items to the individuals in association with the personal identifiers, wherein the transmitting includes stopping transmission of the received message to transmit the specified one or more personal identifiers to the postal company.

16. The transmission support method according to claim 13, wherein the specifying includes notifying the transmitter of a number of the specified one or more personal identifiers, wherein the transmitter sends the notified number of delivery objects to a delivery company that holds information involved to deliver the delivery objects to the individuals in association with the personal identifiers, and the transmitting includes stopping transmission of the received message to transmit the specified personal identifiers to the delivery company.

17. The transmission support method according to claim 13, wherein the specifying includes specifying a first number that is a number of the specified one or more personal identifiers and a second number that is a number of identifiers in a union of the personal identifiers of the individuals separately held by the plurality of companies, and the transmitting includes transmitting a ratio of the first number to the second number to the transmitter.

18. The transmission support method according to claim 13, wherein when receiving a message and conditions regarding attributes of individuals from a transmission requester of the message, transmitting the message to a first company that transmits the message to the individuals as an agency of the transmission requester; and when receiving a management identifier of the message generated by the first company in response to reception of the message from the first company, transmitting the conditions and the management identifier to each of a plurality of second companies that holds information on the attributes, wherein the plurality of second companies transmits lists of personal identifiers of the individuals who have the attributes according to the conditions and the management identifier to the first company, and the first company specifies the one or more personal identifiers that exist in two or more lists that are included in lists received from the plurality of second companies and have a same management identifier, and transmits the specified one or more personal identifiers and the received message.

* * * * *